(12) United States Patent
Togashi

(10) Patent No.: US 7,203,054 B2
(45) Date of Patent: Apr. 10, 2007

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/490,122

(22) Filed: Jul. 21, 2006

(65) Prior Publication Data

US 2007/0047176 A1    Mar. 1, 2007

(30) Foreign Application Priority Data

Aug. 26, 2005  (JP) ............................ P2005-246340

(51) Int. Cl.
    *H01G 4/005*  (2006.01)
    *H01G 4/06*   (2006.01)
(52) U.S. Cl. ...................... 361/303; 361/311
(58) Field of Classification Search ........ 361/303–305, 361/311
    See application file for complete search history.

(56) References Cited

U.S. PATENT DOCUMENTS 4,831,494 A * 5/1989 Arnold et al. ........... 361/306.3

2005/0047059 A1* 3/2005 Togashi .................... 361/306.3

FOREIGN PATENT DOCUMENTS

JP      A 2002-299152     7/2006

* cited by examiner

*Primary Examiner*—Eric W. Thomas
(74) *Attorney, Agent, or Firm*—Oliff & Berridge, PLC

(57) ABSTRACT

A multilayer capacitor containing a multilayer body having dielectric layers laminated therein, and multiple first terminal electrodes and multiple second terminal electrodes which are arranged on outer surfaces of the multilayer body. The first and second terminal electrodes are electrically insulated from each other on the multilayer body. The multilayer body also includes multiple first and second inner electrodes having respective lead conductors, a first bridge conductor, and a second conductor. The first inner electrodes are electrically connected to respective first terminal electrodes through their respective lead conductors. The second inner electrodes oppose the first inner electrodes across the dielectric layers, and are electrically connected to respective second terminal electrodes through their respective lead conductors. The first bridge conductor is electrically insulated from the second inner electrodes while electrically connecting the first terminal electrodes. The second conductor is electrically insulated from the first inner electrodes while electrically connecting the second terminal electrodes.

9 Claims, 2 Drawing Sheets

MULTILAYER CAPACITOR

BACKGROUND OF THE INVENTION

1. Field of the Invention

The present invention relates to a multilayer capacitor.

2. Related Background Art

Known as a multilayer capacitor is one comprising a multilayer body in which a plurality of dielectric layers and a plurality of inner electrodes are alternately laminated, and a plurality of terminal electrodes which are arranged on outer surfaces of the multilayer body while being electrically connected to the respective inner electrodes (see, for example, Japanese Patent Application Laid-Open No. 2002-299152).

For example, the above-mentioned multilayer capacitor is built in a power circuit of LSI, and is used for regulating fluctuations in voltage accompanying abrupt changes in current, so as to stabilize the power circuit.

SUMMARY OF THE INVENTION

If the equivalent series resistance of a multilayer capacitor becomes extremely small, the power may greatly drop or cause a damped oscillation such as ringing when resonance is caused by an inductance of a peripheral circuit. This makes the power circuit unstable.

In the multilayer capacitor disclosed in Japanese Patent Application Laid-Open No. 2002-299152, for lowering its equivalent series inductance, a plurality of lead conductors are formed for each inner electrode so as to be led from the inner electrode and connected to the terminal electrode, and their led length is shortened. Therefore, the multilayer capacitor disclosed in Japanese Patent Application Laid-Open No. 2002-299152 may yield an extremely small equivalent series resistance, whereby the power circuit connected thereto may become unstable.

For overcoming the problem mentioned above, it is an object of the present invention to provide a multilayer capacitor having a relatively large equivalent series resistance.

Meanwhile, it has been necessary for a multiterminal multilayer capacitor equipped with a plurality of terminal electrodes as mentioned above to electrically connect homopolar terminal electrodes for measurement at the time of inspecting its capacitance, which complicates the inspection. Therefore, it is another object of the present invention to provide a multilayer capacitor which makes it easier to inspect its capacitance.

The present invention provides a multilayer capacitor comprising a multilayer body having a plurality of dielectric layers laminated therein, a plurality of first terminal electrodes arranged on an outer surface of the multilayer body, and a plurality of second terminal electrodes arranged on an outer surface of the multilayer body while being electrically insulated from the plurality of first terminal electrodes; wherein the multilayer body has a plurality of inner conductors arranged so as to interpose at least one dielectric layer therebetween; wherein the plurality of inner conductors include a plurality of first inner electrodes each having one lead conductor, a plurality of second inner electrodes each having one lead conductor, a first bridge conductor, and a second bridge conductor; wherein the first inner electrodes are electrically connected to respective first terminal electrodes in the plurality of first terminal electrodes through the respective lead conductors; wherein the second inner electrodes are arranged so as to oppose the first inner electrodes by way of the dielectric layers while being electrically connected to respective second terminal electrodes in the plurality of second terminal electrodes through the respective lead conductors; wherein the first bridge conductor is arranged so as to be electrically insulated from the second inner electrodes while electrically connecting the plurality of first terminal electrodes; and wherein the second bridge conductor is arranged so as to be electrically insulated from the first inner electrodes while electrically connecting the plurality of second terminal electrodes.

In the multilayer capacitor in accordance with the present invention, the plurality of first terminal electrodes are electrically connected to each other by the first bridge conductor, whereas the plurality of second terminal electrodes are electrically connected to each other by the second bridge conductor. This makes it unnecessary for the plurality of first terminal electrodes to be electrically connected to each other and for the plurality of second terminal electrodes to be electrically connected to each other on the outside of the multilayer capacitor at the time of inspecting the capacitance, whereby the inspection can be performed easily. The first bridge conductor is arranged so as to be electrically insulated from the second inner electrodes, while the second bridge conductor is arranged so as to be electrically insulated from the first inner electrodes, whereby the first and second bridge conductors do not hamper functions as a capacitor.

In the multilayer capacitor in accordance with the present invention, the first inner electrodes are electrically connected to respective first terminal electrodes through the respective lead conductors, while the second inner electrodes are electrically connected to respective second terminal electrodes through the respective lead conductors. Therefore, in the multilayer capacitor in accordance with the present invention, current paths are limited, whereby its equivalent series resistance becomes relatively large.

Preferably, the first bridge conductor is positioned on one outermost side in the laminating direction in the plurality of inner conductors, whereas the second bridge conductor is positioned on the other outermost side in the laminating direction in the plurality of inner conductors. In this case, the first and second bridge conductors are arranged without affecting the relative positional relationship between the first and second inner electrodes. This can restrain the capacitance of the multilayer capacitor from being affected by arranging the first and second bridge conductors.

Preferably, the first bridge conductor is adjacent to the first inner electrode in the laminating direction, whereas the second bridge conductor is adjacent to the second inner electrode in the laminating direction. In this case, the first bridge conductor is not adjacent to the heteropolar second inner electrodes in the laminating direction, while the second bridge conductor is not adjacent to the heteropolar first inner electrodes in the laminating direction. This can prevent capacitance from occurring between the first bridge conductor and second inner electrodes and between the second bridge conductor and first inner electrodes.

Preferably, the first and second bridge conductors have a portion narrower than the width of each of the first and second terminal electrodes. In this case, the first and second bridge conductors yield greater electric resistances, whereby the multilayer capacitor exhibits a much greater equivalent series resistance.

Preferably, the first and second bridge conductors have areas smaller than the first and second inner electrodes, respectively, as seen in the laminating direction. In this case, the first and second bridge conductors yield greater electric resistances, whereby the multilayer capacitor exhibits a much greater equivalent series resistance.

The present invention can provide a multilayer capacitor which makes it easier to inspect the capacitance while having a relatively large equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, a preferred embodiment of the present invention will be explained in detail with reference to the accompanying drawings. In the explanation, constituents identical to each other or those having functions identical to each other will be referred to with numerals identical to each other without repeating their overlapping descriptions.

Figure 1:
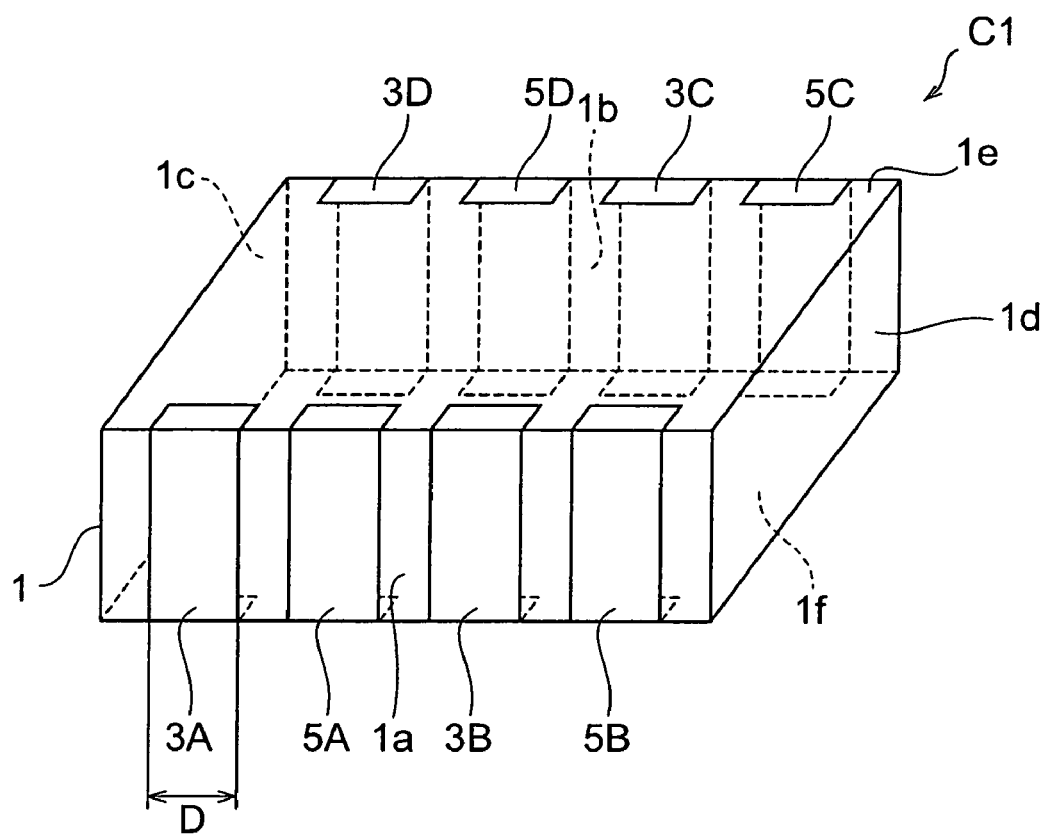
FIG. 1 is a perspective view of the multilayer capacitor in accordance with an embodiment.
Figure 2:
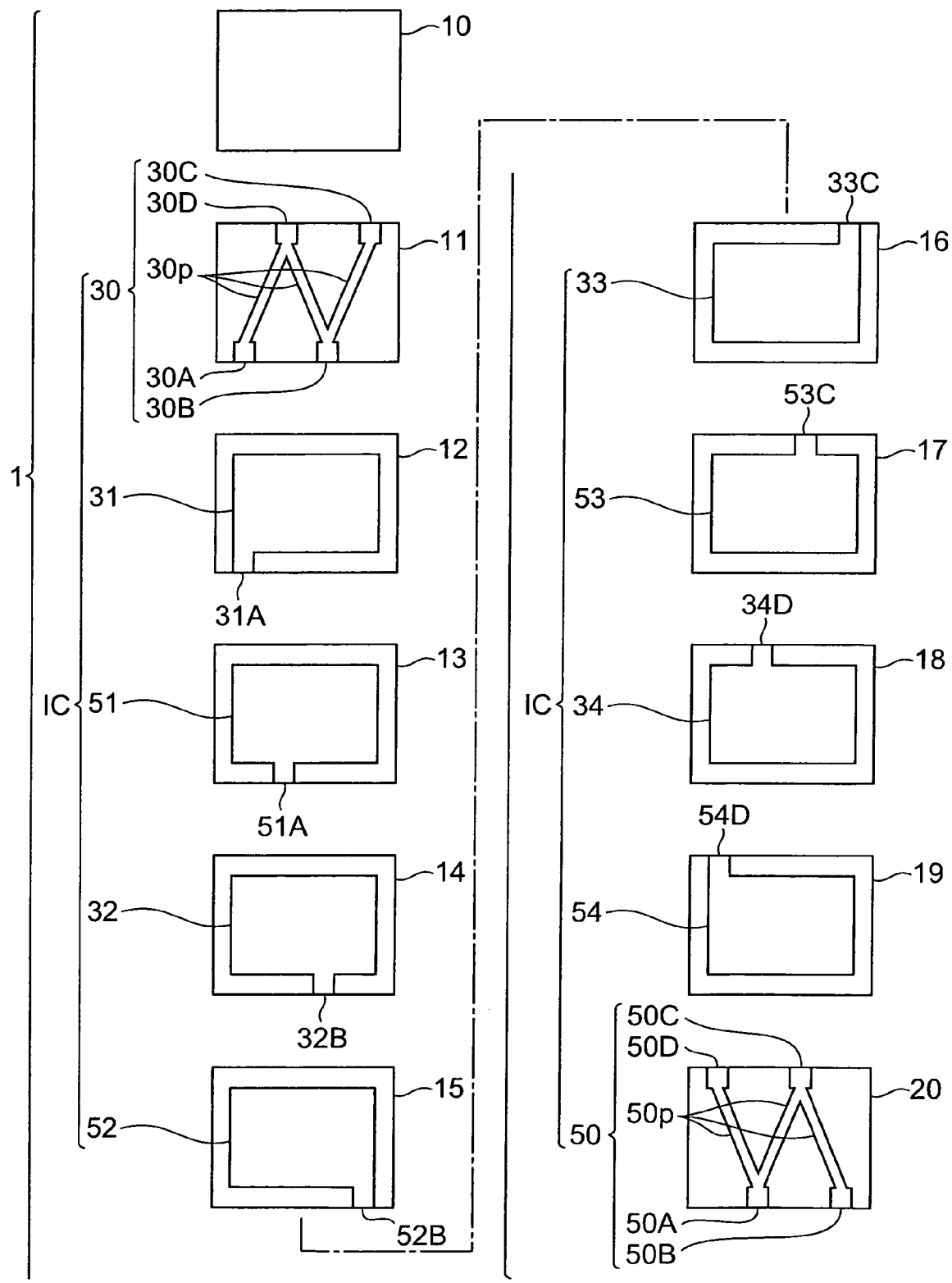
FIG. 2 is an exploded view of the multilayer body included in the multilayer capacitor in accordance with the embodiment.

With reference to FIGS. 1 and 2, the structure of the multilayer capacitor C1 in accordance with this embodiment will be explained. FIG. 1 is a perspective view of the multilayer capacitor in accordance with this embodiment. FIG. 2 is an exploded view of the multilayer body provided in the multilayer capacitor in accordance with the embodiment.

As shown in FIG. 1, the multilayer capacitor C1 comprises a rectangular parallelepiped multilayer body 1, and first terminal electrodes 3A to 3D and second terminal electrodes 5A to 5D which are arranged on outer surfaces of the multilayer body 1. The multilayer body 1 has a pair of side faces 1a, 1b, perpendicular to the laminating direction, opposing each other; a pair of end faces 1c, 1d, perpendicular to the laminating direction and the side faces 1a, 1b, opposing each other; and a pair of side faces 1e, 1f, perpendicular to the side faces 1a, 1b and end faces 1c, 1d, opposing each other.

The first terminal electrodes 3A to 3D and second terminal electrodes 5A to 5D are arranged on the side faces 1a, 1b of the multilayer body 1. The first terminal electrodes 3A, 3B have substantially band-like electrode portions extending in a direction parallel to the laminating direction on the side face 1a of the multilayer body 1 and are bent to the side faces 1e, 1f. The first terminal electrodes 3C, 3D have substantially band-like electrode portions extending in a direction parallel to the laminating direction on the side face 1b of the multilayer body 1 and are bent to the side faces 1e, 1f. The second terminal electrodes 5A, 5B have substantially band-like electrode portions extending in a direction parallel to the laminating direction on the side face 1a of the multilayer body 1 and are bent to the side faces 1e, 1f. The second terminal electrodes 5C, 5D have substantially band-like electrode portions extending in a direction parallel to the laminating direction on the side face 1b of the multilayer body 1 and are bent to the side faces 1e, 1f.

Each of the first terminal electrodes 3A to 3D and second terminal electrodes 5A to 5D is formed with a substantially constant width D. The width D is the length of each of the first terminal electrodes 3A to 3D and second terminal electrodes 5A to 5D in the opposing direction of the pair of end faces 1c, 1d (in the direction parallel to a pair of side faces 1a, 1b and perpendicular to the laminating direction).

On the side faces 1a, 1b, the first terminal electrodes 3A to 3D and second terminal electrodes 5A to 5D are arranged alternately. Namely, the first terminal electrode 3A, second terminal electrode 5A, first terminal electrode 3B, and second terminal electrode 5B are arranged on the side face 1a successively from the side face 1c to 1d. The first terminal electrode 3C, second terminal electrode 5C, first terminal electrode 3D, and second terminal electrode 5D are arranged on the side face 1b successively from the side face 1c to 1d. The first terminal electrodes 3A to 3D and the second terminal electrodes 5A to 5D are electrically insulated from each other.

As shown in FIG. 2, the multilayer body 1 has a plurality of dielectric layers 10 to 20 and a plurality of inner conductors IC. The plurality of dielectric layers 10 to 20 each having a substantially rectangular form are laminated. In this embodiment, 11 dielectric layers 10 to 20 are laminated. In the actual multilayer capacitor C1, the dielectric layers 10 to 20 are integrated to such an extent that their boundaries are indiscernible. In this embodiment, the dielectric layers 10 to 20 and the inner conductors IC are arranged alternately in the multilayer body 1. The plurality of inner conductors IC are arranged such that each pair of them interpose at least one dielectric layer therebetween.

The plurality of inner conductors IC include first inner electrodes 31 to 34, second inner electrodes 51 to 54, a first bridge conductor 30, and a second bridge conductor 50. In this embodiment, four each of the first inner electrodes 31 to 34 and second inner electrodes 51 to 54, and one each of the first bridge conductor 30 and second bridge conductor 50 are laminated.

The first inner electrodes 31 to 34, each having a substantially rectangular form, are positioned with predetermined distances from the side faces 1a to 1d of the multilayer body 1. The first inner electrodes 31 to 34 have respective lead conductors 31A, 32B, 33C, 34D. The lead conductor 31A is formed so as to be led to a position where the first terminal electrode 3A is arranged on the side face 1a of the multilayer body 1, and is electrically connected to the first terminal electrode 3A. The lead conductor 32B is formed so as to be led to a position where the first terminal electrode 3B is arranged on the side face 1a of the multilayer body 1, and is electrically connected to the first terminal electrode 3B. The lead conductor 33C is formed so as to be led to a position where the first terminal electrode 3C is arranged on the side face 1b of the multilayer body 1, and is electrically connected to the first terminal electrode 3C. The lead conductor 34D is formed so as to be led to a position where the first terminal electrode 3D is arranged on the side face 1b of the multilayer body 1, and is electrically connected to the first terminal electrode 3D. Consequently, the first inner electrodes 31 to 34 are electrically connected to respective first terminal electrodes 3A to 3D in the plurality of first terminal electrodes 3A to 3D through their corresponding lead conductors 31A, 32B, 33C, 34D. The lead conductor 31A is integrally formed with the first inner electrodes 31. The lead conductor 32B is integrally formed with the first inner electrodes 32. The lead conductor 33C is integrally formed with the first inner electrodes 33. The lead conductor 34D is integrally formed with the first inner electrodes 34.

The second inner electrodes 51 to 54, each having a substantially rectangular form, are positioned with predetermined distances from the side faces 1a to 1d of the multilayer body 1. The second inner electrodes 51 to 54 have respective lead conductors 51A, 52B, 53C, 54D. The lead conductor 51A is formed so as to be led to a position where the second terminal electrode 5A is arranged on the side face 1a of the multilayer body 1, and is electrically connected to the second terminal electrode 5A. The lead conductor 52B is formed so as to be led to a position where the second terminal electrode 5B is arranged on the side face 1a of the multilayer body 1, and is electrically connected to the second terminal electrode 5B. The lead conductor 53C is formed so as to be led to a position where the second terminal electrode 5C is arranged on the side face 1b of the multilayer body 1, and is electrically connected to the second terminal electrode 5C. The lead conductor 54D is formed so as to be led to a position where the second terminal electrode 5D is arranged on the side face 1b of the multilayer body 1, and is electrically connected to the second terminal electrode 5D. Consequently, the second inner electrodes 51 to 54 are electrically connected to respective second terminal electrodes 5A to 5D in the plurality of second terminal electrodes 5A to 5D through their corresponding lead conductors 51A, 52B, 53C, 54D. The lead conductor 51A is integrally formed with the second inner electrodes 51. The lead conductor 52B is integrally formed with the second inner electrodes 52. The lead conductor 53C is integrally formed with the second inner electrodes 53. The lead conductor 54D is integrally formed with the second inner electrodes 54.

The first bridge conductor 30 includes a plurality of lead conductors 30A to 30D and a plurality of connecting conductors 30p. The lead conductors 30A to 30D are electrically connected to their corresponding respective first terminal electrodes 3A to 3D. The connecting conductors 30p electrically connect their corresponding lead conductors 30A to 30D to each other in the multilayer body 1. The lead conductor 30A is formed so as to be led to a position where the first terminal electrode 3A is arranged on the side face 1a of the multilayer body 1. The lead conductor 30B is formed so as to be led to a position where the first terminal electrode 3B is arranged on the side face 1a of the multilayer body 1. The lead conductor 30C is formed so as to be led to a position where the first terminal electrode 3C is arranged on the side face 1b of the multilayer body 1. The lead conductor 30D is formed so as to be led to a position where the first terminal electrode 3D is arranged on the side face 1b of the multilayer body 1. The first bridge conductor 30 has an area smaller than that of each of the first inner electrodes 31 to 34 and second inner electrodes 51 to 54 as seen in the laminating direction.

The connecting conductors 30p extend substantially linearly so as to connect their corresponding lead conductors 30A to 30D to each other. The connecting conductors 30p electrically connect the lead conductors 30A and 30D to each other, the lead conductors 30D and 30B to each other, and the lead conductors 30B and 30C to each other. The connecting conductors 30p are integrally formed with the lead conductors 30A to 30D.

Each of the connecting conductors 30p has a width narrower than the width D of each of the first terminal electrodes 3A to 3D and second terminal electrodes 5A to 5D. The width of each connecting conductor 30p is narrower than that of each of the lead conductors 30A to 30D. The width of each of the lead conductors 30A to 30D is the length of each of the lead conductors 30A to 30D in a direction parallel to the side faces 1a, 1b.

The second bridge conductor 50 includes a plurality of lead conductors 50A to 50D and a plurality of connecting conductors 50p. The lead conductors 50A to 50D are electrically connected to their corresponding respective second terminal electrodes 5A to 5D. The connecting conductors 50p electrically connect their corresponding lead conductors 50A to 50D to each other in the multilayer body 1. The lead conductor 50A is formed so as to be led to a position where the second terminal electrode 5A is arranged on the side face 1a of the multilayer body 1. The lead conductor 50B is formed so as to be led to a position where the second terminal electrode 5B is arranged on the side face 1a of the multilayer body 1. The lead conductor 50C is formed so as to be led to a position where the second terminal electrode 5C is arranged on the side face 1b of the multilayer body 1. The lead conductor 50D is formed so as to be led to a position where the second terminal electrode 5D is arranged on the side face 1b of the multilayer body 1. The second bridge conductor 50 has an area smaller than that of each of the first inner electrodes 31 to 34 and second inner electrodes 51 to 54 as seen in the laminating direction.

The connecting conductors 50p extend substantially linearly so as to connect their corresponding lead conductors 50A to 50D to each other. The connecting conductors 50p electrically connect the lead conductors 50D and 50A to each other, the lead conductors 50A and 50C to each other, and the lead conductors 50C and 50B to each other. The connecting conductors 50p are integrally formed with the lead conductors 50A to 50D.

Each of the connecting conductors 50p has a width narrower than the width D of each of the first terminal electrodes 3A to 3D and second terminal electrodes 5A to 5D. The width of each connecting conductor 50p is narrower than that of each of the lead conductors 50A to 50D. The width of each of the lead conductors 50A to 50D is the length of each of the lead conductors 50A to 50D in a direction parallel to the side faces 1a, 1b.

The first inner electrodes 31 to 34 and the second inner electrodes 51 to 54 are laminated alternately with each other while interposing the dielectric layers 12 to 18 therebetween. In the laminating direction, the first bridge conductor 30 is adjacent to the first inner electrode 31 in the plurality of inner conductors IC. Namely, the first bridge conductor 30 is positioned on one outermost side in the laminating direction in the plurality of inner conductors IC. In the laminating direction, the second bridge conductor 50 is adjacent to the second inner electrode 54 in the plurality of inner conductors IC. Namely, the second bridge conductor 50 is positioned on the other outermost side in the laminating direction in the plurality of inner conductors IC.

The dielectric layer 10 is laminated on the outer side of the first bridge conductor 30 in the laminating direction. The dielectric layer 20 is laminated on the outer side of the second bridge conductor 50 in the laminating direction. The dielectric layers 10, 20 also function as protective layers.

In this embodiment, as in the foregoing, a plurality of first terminal electrodes 3A to 3D are electrically connected to each other by the first bridge conductor 30, whereas a plurality of second terminal electrodes 5A to 5D are electrically connected to each other by the second bridge conductor 50. This makes it unnecessary for the plurality of first terminal electrodes 3A to 3D to be electrically connected to each other and for the plurality of second terminal electrodes 5A to 5D to be electrically connected to each other on the outside of the multilayer capacitor C1 when inspecting the capacitance of the multilayer capacitor C1, whereby the inspection can be carried out easily. The first bridge conductor 30 is arranged so as to be electrically insulated from the second inner electrodes 51 to 54, while the second bridge conductor 50 is arranged so as to be electrically insulated from the first inner electrodes 31 to 34, whereby the first bridge conductor 30 and second bridge conductor 50 do not hamper functions of the multilayer capacitor C1 as a capacitor.

In this embodiment, the first inner electrodes 31 to 34 are electrically connected to different first terminal electrodes 3A to 3D in the plurality of first terminal electrodes 3A to 3D through the lead conductors 31A, 32B, 33C, 34D, respectively, while the second inner electrodes 51 to 54 are electrically connected to different second terminal electrodes 5A to 5D in the plurality of second terminal electrodes 5A to 5D through the lead conductors 51A, 52B, 53C, 54D, respectively. Therefore, in the multilayer capacitor C1, current paths are limited, and its equivalent series resistance becomes relatively large.

In this embodiment, the first bridge conductor 30 is positioned on one outermost side in the laminating direction in the plurality of inner conductors IC, whereas the second bridge conductor 50 is positioned on the other outermost side in the laminating direction in the plurality of inner conductors IC. This allows the first bridge conductor 30 and second bridge conductor 50 to be arranged without affecting the relative positional relationship between the first inner electrodes 3A to 3D and second inner electrodes 5A to 5D. As a result, the capacitance of the multilayer capacitor C1 can be restrained from being affected by arranging the first bridge conductor 30 and the second bridge conductor 50.

In this embodiment, the first bridge conductor 30 is adjacent to the first inner electrode 31 in the laminating direction, while the second bridge conductor 50 is adjacent to the second inner electrode 54 in the laminating direction. Consequently, the first bridge conductor 30 is not adjacent to the heteropolar second inner electrodes 51 to 54 in the laminating direction, while the second bridge conductor 50 is not adjacent to the heteropolar first inner electrodes 31 to 34 in the laminating direction. As a result, capacitance can be prevented from occurring between the first bridge conductor 30 and second inner electrodes 51 to 54 and between the second bridge conductor 50 and first inner electrodes 31 to 34.

In this embodiment, the first bridge conductor 30 and second bridge conductor 50 have connecting conductors 30$p$, 50$p$ with a width narrower than the width D of each of the first terminal electrodes 3A to 3D and second terminal electrodes 5A to 5D. This allows the first bridge conductor 30 and second bridge conductor 50 to yield greater electric resistances, whereby the multilayer capacitor C1 exhibits a much greater equivalent series resistance.

In this embodiment, each of the first bridge conductor 30 and second bridge conductor 50 has an area smaller than that of each of the first inner electrodes 31 to 34 and second inner electrodes 51 to 54. This also allows the first bridge conductor 30 and second bridge conductor 50 to yield greater electric resistances, whereby the multilayer capacitor exhibits a much greater equivalent series resistance.

Each of the connecting conductors 30$p$, 50$p$ has a width narrower than that of each of the lead conductors 30A to 30D, 50A to 50D. Thus narrowing the widths of the connecting conductors 30$p$, 50$p$ can make the equivalent series resistance greater. Widening the lead conductors 30A to 30D, 50A to 50D can more reliably bring the lead conductors 30A to 30D, 50A to 50D into physical contact with the first and second terminal electrodes 3A to 3D, 5A to 5D. Therefore, making the width of the connecting conductors 30$p$, 50$p$ narrower than that of the lead conductors 30A to 30D, 50A to 50D can more reliably bring the lead conductors 30A to 30D, 50A to 50D into physical contact with the first and second terminal electrodes 3A to 3D, 5A to 5D and can yield a greater equivalent series resistance.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
    a multilayer body having a plurality of dielectric layers laminated therein;
    a plurality of first terminal electrodes arranged on an outer surface of the multilayer body; and
    a plurality of second terminal electrodes arranged on an outer surface of the multilayer body while being electrically insulated from the plurality of first terminal electrodes;
    wherein the multilayer body has a plurality of inner conductors arranged so as to interpose at least one dielectric layer therebetween;
    wherein the plurality of inner conductors include a plurality of first inner electrodes each having one lead conductor, a plurality of second inner electrodes each having one lead conductor, a first bridge conductor, and a second bridge conductor;
    wherein the first inner electrodes are electrically connected to respective first terminal electrodes in the plurality of first terminal electrodes through the respective lead conductors;
    wherein the second inner electrodes are arranged so as to oppose the first inner electrodes by way of the dielectric layers while being electrically connected to respective second terminal electrodes in the plurality of second terminal electrodes through the respective lead conductors;
    wherein the first bridge conductor is arranged so as to be electrically insulated from the second inner electrodes while electrically connecting the plurality of first terminal electrodes, and the first bridge conductor is positioned on one outermost side in a laminating direction in the plurality of inner conductors; and
    wherein the second bridge conductor is arranged so as to be electrically insulated from the first inner electrodes while electrically connecting the plurality of second terminal electrodes, and the second bridge conductor is positioned on the other outermost side in the laminating direction in the plurality of inner conductors.

2. A multilayer capacitor according to claim 1, wherein the first bridge conductor is adjacent to the first inner electrode in the laminating direction; and
    wherein the second bridge conductor is adjacent to the second inner electrode in the laminating direction.

3. A multilayer capacitor according to claim 2, wherein the first and second bridge conductors have a portion narrower than the width of each of the first and second terminal electrodes.

4. A multilayer capacitor according to claim 2, wherein the first and second bridge conductors have areas smaller than the first and second inner electrodes, respectively, as seen in the laminating direction.

5. A multilayer capacitor according to claim 1, wherein the first and second bridge conductors have a portion narrower than the width of each of the first and second terminal electrodes.

6. A multilayer capacitor according to claim 1, wherein the first and second bridge conductors have areas smaller than the first and second inner electrodes, respectively, as seen in the laminating direction.

7. A multilayer capacitor comprising:
a multilayer body having a plurality of dielectric layers laminated therein;
a plurality of first terminal electrodes arranged on an outer surface of the multilayer body; and
a plurality of second terminal electrodes arranged on an outer surface of the multilayer body while being electrically insulated from the plurality of first terminal electrodes;
wherein the multilayer body has a plurality of inner conductors arranged so as to interpose at least one dielectric layer therebetween;
wherein the plurality of inner conductors include a plurality of first inner electrodes each having one lead conductor, a plurality of second inner electrodes each having one lead conductor, a first bridge conductor, and a second bridge conductor;
wherein the first inner electrodes are electrically connected to respective first terminal electrodes in the plurality of first terminal electrodes through the respective lead conductors;
wherein the second inner electrodes are arranged so as to oppose the first inner electrodes by way of the dielectric layers while being electrically connected to respective second terminal electrodes in the plurality of second terminal electrodes through the respective lead conductors;
wherein the first bridge conductor is arranged so as to be electrically insulated from the second inner electrodes while electrically connecting the plurality of first terminal electrodes;
wherein the second bridge conductor is arranged so as to be electrically insulated from the first inner electrodes while electrically connecting the plurality of second terminal electrodes; and
wherein the first and second bridge conductors have a portion narrower than the width of each of the first and second terminal electrodes.

8. The multilayer capacitor according to claim 7, wherein the first bridge conductor is not adjacent to the second inner electrode in a laminating direction; and
wherein the second bridge conductor is not adjacent to the first inner electrode in the laminating direction.

9. A multilayer capacitor comprising:
a multilayer body having a plurality of dielectric layers laminated therein;
a plurality of first terminal electrodes arranged on an outer surface of the multilayer body; and
a plurality of second terminal electrodes arranged on an outer surface of the multilayer body while being electrically insulated from the plurality of first terminal electrodes;
wherein the multilayer body has a plurality of inner conductors arranged so as to interpose at least one dielectric layer therebetween;
wherein the plurality of inner conductors include a plurality of first inner electrodes each having one lead conductor, a plurality of second inner electrodes each having one lead conductor, a first bridge conductor, and a second bridge conductor;
wherein the first inner electrodes are electrically connected to respective first terminal electrodes in the plurality of first terminal electrodes through the respective lead conductors;
wherein the second inner electrodes are arranged so as to oppose the first inner electrodes by way of the dielectric layers while being electrically connected to respective second terminal electrodes in the plurality of second terminal electrodes through the respective lead conductors;
wherein the first bridge conductor is arranged so as to be electrically insulated from the second inner electrodes while electrically connecting the plurality of first terminal electrodes;
wherein the second bridge conductor is arranged so as to be electrically insulated from the first inner electrodes while electrically connecting the plurality of second terminal electrodes; and
wherein the first and second bridge conductors have areas smaller than the first and second inner electrodes, respectively, as seen in a laminating direction.

* * * * *